US008419106B2

(12) United States Patent
Baba et al.

(10) Patent No.: US 8,419,106 B2
(45) Date of Patent: Apr. 16, 2013

(54) LID OPENING AND CLOSING APPARATUS

(75) Inventors: Naoki Baba, Tomi (JP); Junichi Yamamaru, Ebina (JP)

(73) Assignee: Johnan Manufacturing Inc., Nagano (JP)

( * ) Notice: Subject to any disclaimer, the term of this patent is extended or adjusted under 35 U.S.C. 154(b) by 63 days.

(21) Appl. No.: 13/113,324

(22) Filed: May 23, 2011

(65) Prior Publication Data

US 2011/0285166 A1 Nov. 24, 2011

(30) Foreign Application Priority Data

May 24, 2010 (JP) ................................ 2010-118727

(51) Int. Cl.
*B60J 7/20* (2006.01)

(52) U.S. Cl.
USPC ........................................ 296/107.08; 296/76

(58) Field of Classification Search .................... 296/76, 296/107.08
See application file for complete search history.

(56) References Cited

U.S. PATENT DOCUMENTS

| | | | | |
|---|---|---|---|---|
| 6,601,903 | B2 * | 8/2003 | Nakagome | 296/76 |
| 2002/0070579 | A1 * | 6/2002 | Nakagome | 296/76 |
| 2002/0096905 | A1 * | 7/2002 | Nicholas et al. | 296/76 |

FOREIGN PATENT DOCUMENTS

| | | |
|---|---|---|
| DE | 10212514 | 10/2003 |
| JP | 2000-313357 | 11/2000 |
| JP | 2004-161076 | 6/2004 |

OTHER PUBLICATIONS

Extended European Search Report dated May 7, 2012 issued in corresponding European Patent Application No. 11167125.1.

* cited by examiner

*Primary Examiner* — Lori Lyjak
(74) *Attorney, Agent, or Firm* — Staas & Halsey LLP

(57) ABSTRACT

A four-bar linkage is provided with an opened position holding mechanism. The opened position holding mechanism includes: an engagement pin which protrudes in a rear end portion of a second hinge arm; a support pin which protrudes in a base end portion of an extending portion of a link bracket; a hook bracket having a central portion which is turnably supported by the support pin; and an urging spring which pulls the hook bracket in one direction with respect to the support pin as the center. The hook bracket includes: a guide surface; and an engagement concave portion to be engaged with the engagement pin. The guide surface hits against the engagement pin in accordance with a lid opening operation, and a hit position therebetween relatively moves in a central direction in accordance with a turn with respect to the support pin as the center performed against the pulling force of the urging spring.

6 Claims, 9 Drawing Sheets

TOP
REAR
FRONT
BOTTOM
40°
20
24
26
27
12
3
10
19
11
18
23

20°

FULLY CLOSED STATE
9

LID OPENING AND CLOSING APPARATUS

BACKGROUND OF THE INVENTION

1. Field of the Invention

The present invention relates to a lid opening and closing apparatus formed in a vehicle body.

2. Description of the Related Art

In order to protect a charging port of a power feeding apparatus for an electric automobile, a lid is openably and closably provided to the charging port. When a power feeding operation is performed, the lid is opened to a fully opened state, and needs to be held in the fully opened state so as not be closed during the power feeding operation. A conventionally known example of such a support structure of the opened state of the lid includes a hood support structure for an automobile disclosed in Japanese Patent Laid-Open No. 2000-313357.

In addition, a hood hinge structure for a vehicle is disclosed in, for example, Japanese Patent Laid-Open No. 2004-161076. In the hood hinge structure for the vehicle, a hood hinge of a four-bar linkage is configured by: a hood-side bracket attached to a lower surface of a rear end portion of a hood; a vehicle body-side bracket attached to a vehicle body member; a first link having an upper portion which is turnably supported by the hood-side bracket and a lower portion which is rotatably supported by the vehicle body-side bracket; and a second link which is longer than the first link and has a rear portion which is turnably supported by the hood-side bracket and a front portion which is rotatably supported by the vehicle body-side bracket, and the hood is openably and closably attached to the vehicle body member by means of the hood hinge thus configured.

In the hood hinge structure disclosed in Japanese Patent Laid-Open No. 2004-161076, the hood-side bracket includes: a hood attachment portion attached to the hood; a first link attachment portion which is formed at an outer edge of the hood attachment portion in a vehicle width direction, and rotatably supports the upper portion of the first link; and a second link attachment portion which is formed at an inner edge of the hood attachment portion in the vehicle width direction, and rotatably supports the rear portion of the second link. The vehicle body-side bracket includes: a base portion attached to the vehicle body member; a first link attachment portion which is formed at an outer edge of the base portion in the vehicle width direction, and rotatably supports the lower portion of the first link; and a second link attachment portion which is formed at an inner edge of the base portion in the vehicle width direction, and rotatably supports the front portion of the second link. Then, in the hood-side bracket, the second link attachment portion formed in the hood-side bracket is formed on a front side of the vehicle body with respect to the first link attachment portion.

In the hood support structure for the automobile disclosed in Japanese Patent Laid-Open No. 2000-313357, an operation of hooking a support rod needs to be performed while a hood is held in an opened state. Therefore, an operator is required to use both hands, and it is inconvenient in the case where the operator performs an operation while having a power feeder in one hand. In addition, with regard to the hood hinge structure disclosed in Japanese Patent Laid-Open No. 2004-161076, a mechanism which holds the hood in the opened state is not disclosed.

SUMMARY OF THE INVENTION

The present invention has an object to provide a lid opening and closing apparatus which can be operated with one hand from start of an opening operation to holding of a fully opened state of a lid, can save more space compared with an apparatus using a gas cylinder, and can be manufactured inexpensively in terms of the cost of parts.

The present invention provides a lid opening and closing apparatus which opens and closes a lid for an opening portion formed in a vehicle body, including: a link mechanism which is provided between the lid and the vehicle body and functions as a hinge when the lid is opened and closed; and an opened position holding mechanism which maintains an opened position of the lid, in which the opened position holding mechanism operates in accordance with turns of links included in the link mechanism, and blocks turns between the links, to thereby maintain the opened position of the lid.

The link mechanism may be a four-bar linkage, and may include: a support frame as a first link which is fixed to a periphery of the opening portion of the vehicle body; a link bracket as a second link which is fixed to a rear surface of the lid; and a first hinge arm as a third link and a second hinge arm as a fourth link which are bridged between the link bracket and the support frame. The second hinge arm may be longer than the first hinge arm. The first hinge arm may have an upper end portion which is turnably coupled to the link bracket via a first coupling pin, and a lower end portion which is turnably coupled to the support frame via a second coupling pin. The second hinge arm may have an upper end portion which is turnably coupled to the link bracket on a front side of the first coupling pin via a third coupling pin, and a lower end portion which is turnably coupled to the support frame on a front side of the second coupling pin via a fourth coupling pin. A distance between the first coupling pin and the third coupling pin may be smaller than a distance between the second coupling pin and the fourth coupling pin. A front end portion of the link bracket may turn upward when the lid is opened.

Further, the link bracket may include a lid attachment portion and an extending portion which extends obliquely downward toward a rear side from a rear portion of the lid attachment portion. The extending portion may serve as the second link of the four-bar linkage.

Further, the opened position holding mechanism may include: a first mechanism including a hook bracket which turns in accordance with the turns of the links included in the link mechanism when the lid is opened and closed; and a second mechanism is formed of a stopper structure between a rear portion of the link bracket and the upper end portion of the first hinge arm in the four-bar linkage. The hook bracket of the first mechanism may fix a turn between the link bracket as the second link and the second hinge arm as the fourth link when the lid is located at the opened position. The stopper structure of the second mechanism may fix a turn between the link bracket as the second link and the first hinge arm as the third link at the opened position of the lid. Both of the first mechanism and the second mechanism may release the fixing of the turns between the links when the links turn in a direction in which the lid is closed.

Further, the first mechanism of the opened position holding mechanism may include the hook bracket, an urging spring, and an engagement pin. The hook bracket may have: a central portion which is supported by the link bracket via a support pin, to thereby enable the hook bracket to turn up and down; a front end portion in which an abutment portion against the link bracket is provided; and a rear end portion in which an engagement concave portion engaging with the engagement pin and a smooth guide surface reaching the engagement concave portion are provided. The urging spring may always urge the rear portion of the hook bracket to turn downward. The engagement pin may abut against the upper end portion of the second hinge arm corresponding to the guide surface of the hook bracket, and may be provided in such a position as to be fitted into the engagement concave portion of the hook bracket when the lid is located at the opened position. The hook bracket may be turned by the urging spring in accordance with an opening motion of the lid, the guide surface in the rear portion of the hook bracket may abut from above against the engagement pin provided to the second hinge arm during a latter half of the opening motion, the abutment portion of the hook bracket may abut from below against the link bracket at the opened position of the lid, and the engagement pin may be fitted into the engagement concave portion of the hook bracket, whereby the lid and the link mechanism may be engaged with each other, to thereby block the turns of the links.

Further, the urging spring may be a coil spring and the hook bracket further has a hook portion for the coil spring on the front end portion thereof, the coil spring being suspended between the hook portion of the hook bracket and the rear portion of the link bracket corresponding to an upper portion of the support pin, to thereby always urge the rear portion of the hook bracket to turn downward.

Further, the engagement concave portion formed in the rear end portion of the hook bracket may have a side surface which is closed, the side surface being opposed to a leading end of the engagement pin which is fitted into the engagement concave portion.

According to the lid opening and closing apparatus of the present invention, it is possible to perform the lid opening operation with one hand from start of the opening operation to holding of the fully opened state of the lid. In addition, the link mechanism is provided with the holding structure for holding the lid at the opened position, and hence it is possible to save more space compared with an apparatus using a gas cylinder, and manufacture the apparatus inexpensively in terms of the cost of parts. Further, when the lid is closed from the opened state, the lid can be closed with a smaller operation force compared with the apparatus using the gas cylinder with a repulsive force which is large enough to move up the lid, and a click feeling which is useful to check the opened position can provided.

BRIEF DESCRIPTION OF THE DRAWINGS

The above-mentioned and other objects and features of the present invention will become apparent by way of an embodiment described below with reference to the accompanying drawings. In the accompanying drawings.

DETAILED DESCRIPTION OF THE PREFERRED EMBODIMENTS

Hereinafter, an embodiment of a lid opening and closing apparatus according to the present invention is described in detail with reference to the drawings.

Figure 1:
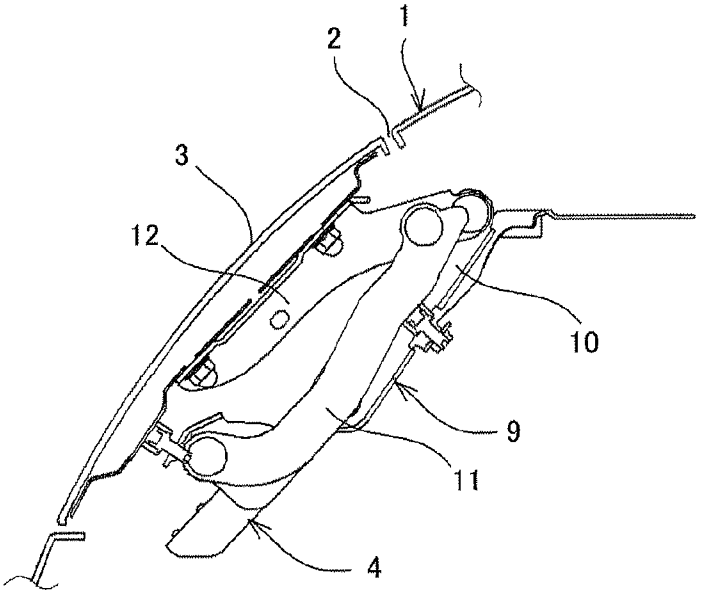
FIG. 1 is a cross sectional view illustrating an opening portion, a support frame, and a lid according to the embodiment of the present invention.
Figure 2:
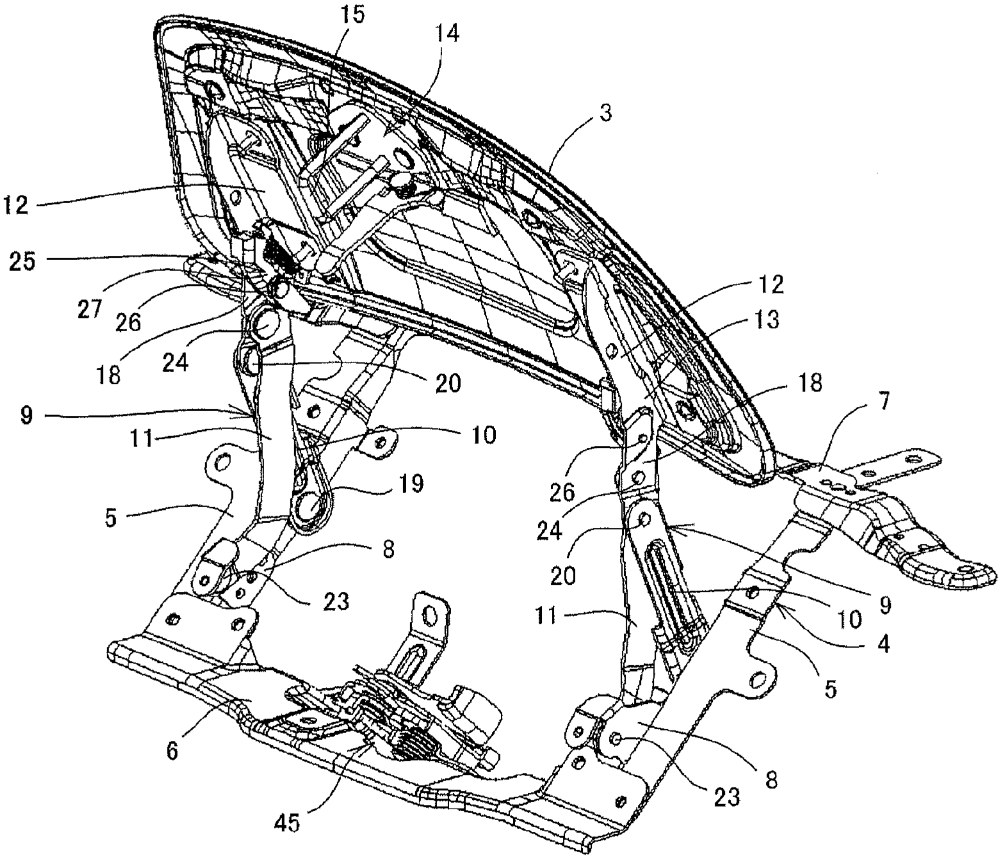
FIG. 2 is a perspective view illustrating the support frame and the lid in a lid opened state according to the embodiment.

In the embodiment, the lid opening and closing apparatus is provided to a lid which protects a charging port of a power feeding apparatus of an electric automobile. FIG. 1 is a cross sectional view illustrating an opening portion which is formed in a vehicle body, a support frame, and the lid according to the embodiment. In addition, FIG. 2 is a perspective view illustrating the support frame and the lid in a lid opened state according to the embodiment. As illustrated in FIG. 1, an opening portion 2 is formed on a panel 1 which constitutes a surface of the vehicle body of the electric automobile, the charging port (not shown) is placed inside of the opening portion 2, and a lid 3 is provided to the opening portion 2.

Figures 11A, 11B, 11C:
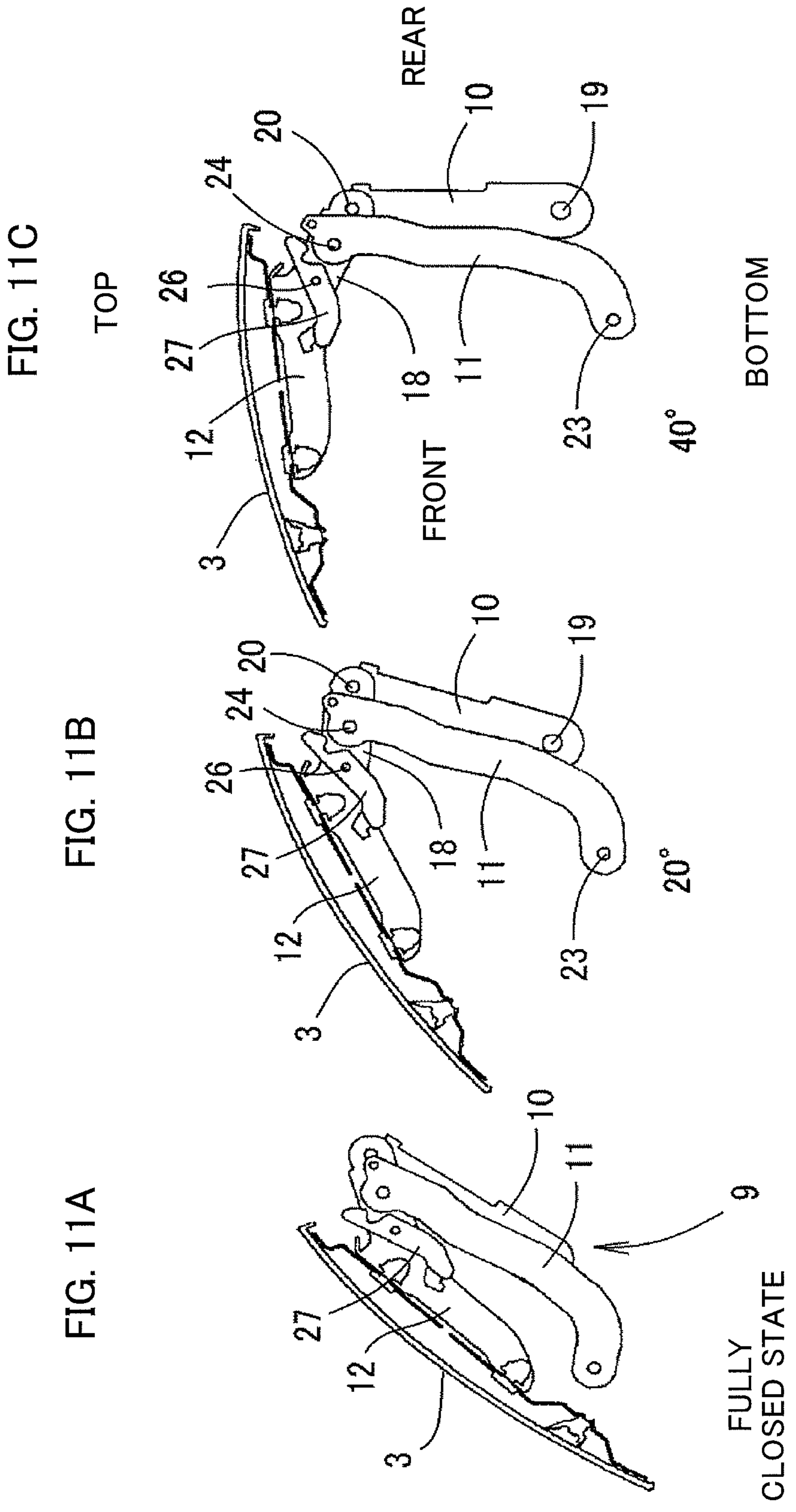
FIGS. 11A, 11B, and 11C are side views illustrating the first half of motion tracks of the lid, the link mechanism, and an opened position holding mechanism from a fully closed state to a fully opened state.

It should be noted that, for the clarification of a positional relation between components, the front, rear, top, and bottom are defined by positions or directions illustrated in FIG. 11C. It is assumed that the right and left are determined when the rear side is observed from the front side. However, in actuality, the opening portion can be provided at various positions, and hence the front, rear, top, and bottom of FIG. 11C do not necessarily coincide with the front, rear, top, and bottom of the vehicle body.

A support frame 4 having a substantially rectangular shape is attached to the vehicle body along a periphery of the opening portion 2. As illustrated in FIG. 2, the support frame 4 is configured by: a pair of side frames 5, 5 which each have a front end which is inclined downward with respect to a rear end, and are parallel to each other; a lower front frame 6 coupled between the front end portions of the right and left side frames 5, 5; and an upper rear frame 7 coupled between the rear end portions of the right and left side frames 5, 5. In addition, brackets 8, 8 which stand upward are fixedly provided on inner sides close to the front ends of the pair of right and left side frames 5, 5, respectively.

Hereinafter, for the sake of simplification, a left-right symmetrical structure such as the side frames 5, 5 is expressed as the side frame 5, and only one of the two components is described.

In addition, a pair of right and left link mechanisms 9 are provided so as to bridge between positions close to right and left sides of a rear end portion of a rear surface of the lid 3 and the pair of right and left side frames 5, respectively. The link mechanism 9 includes a first hinge arm 10, a second hinge arm 11 which is longer than the first hinge arm 10, and a link bracket 12, and turns with respect to the rear end portion of the lid 3 as the center to open and close the opening portion 2.

The support frame 4, the link bracket 12, the first hinge arm 10, and the second hinge arm 11 configure the link mechanism which functions as a hinge when the lid is opened and closed. The support frame 4 corresponds to a first link in a four-bar linkage, and similarly, the link bracket 12, the first hinge arm 10, and the second hinge arm 11 correspond to a second link, a third link, and a fourth link in the four-bar linkage, respectively.

A striker top 14 is fixed to a central portion close to a front end of the rear surface of the lid 3, and a lock mechanism 45 which engages with a striker 15 of the striker top 14 to lock the lid 3 in a closed state is provided on an inner side of a central portion of the lower front frame 6 of the support frame 4.

[Link Mechanism 9]

As illustrated in FIG. 2, the pair of link brackets 12 which are parallel to each other are attached to positions close to both sides of the rear surface of the lid 3 along a front-rear direction of the lid 3. The pair of first hinge arms 10 which are parallel to each other are provided on inner sides of intermediate portions of the pair of right and left side frames 5, and the second hinge arms 11 are provided on inner sides of the right and left brackets 8.

Figure 3:
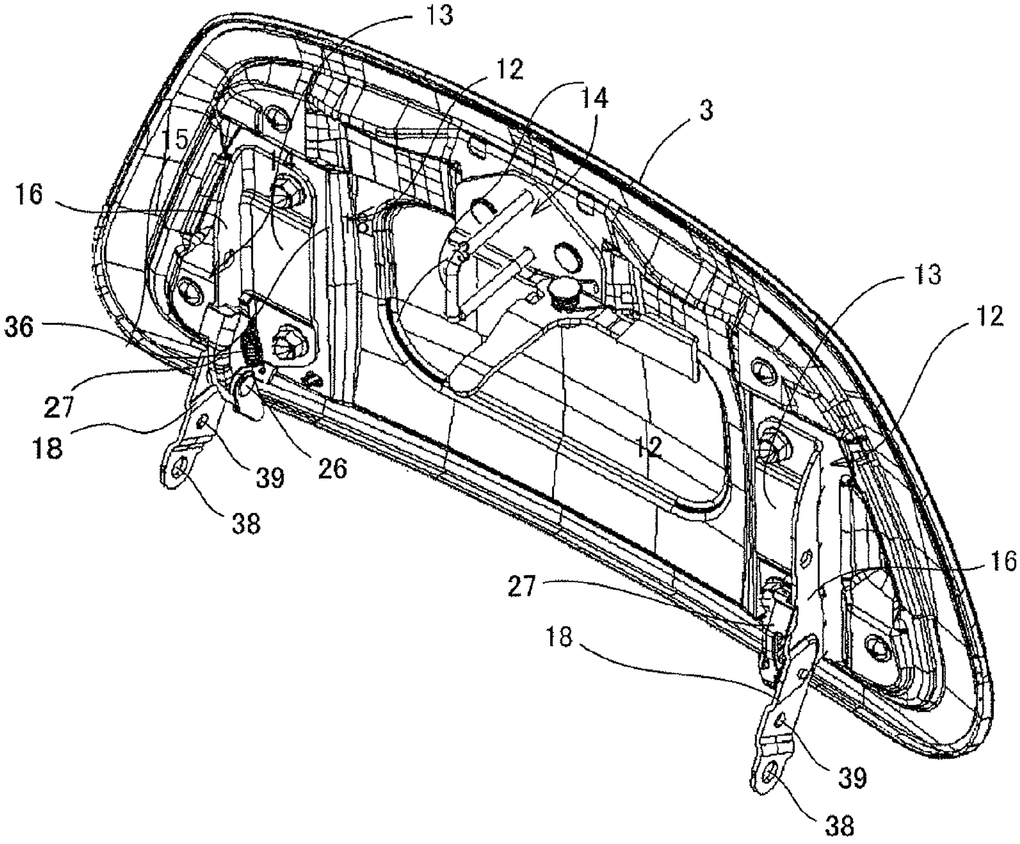
FIG. 3 is a view illustrating a rear surface of the lid to which a link bracket is attached.

As illustrated in FIG. 3, the link bracket 12 includes a plate-like lid attachment portion 13, and is fixed with the lid attachment portion 13 being attached to the rear surface of the lid 3. A pendant plate 16 which is bent downward is formed at an outer edge of the lid attachment portion 13 of the link bracket 12, and a hook piece 17 (FIG. 8) is integrally formed by bending a rear end edge of the lid attachment portion 13. An extending portion 18 which extends obliquely downward toward a rear side of the lid 3 is integrally formed in a rear portion of the pendant plate 16 of the link bracket 12.

Figure 8:
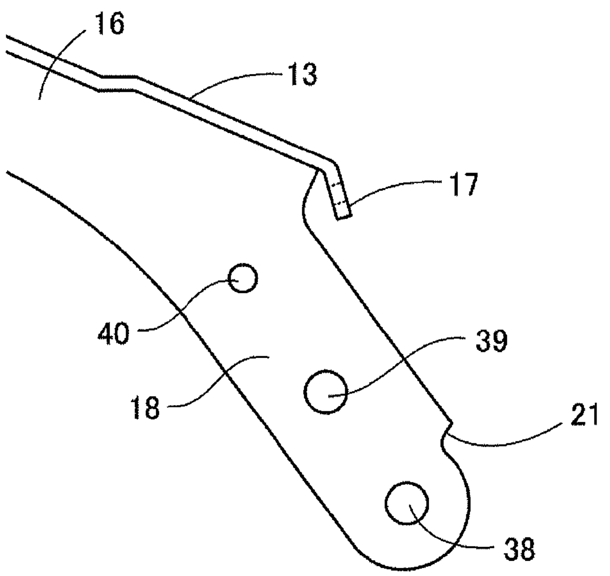
FIG. 8 is a side view illustrating a main part of the link bracket, which is observed from the inner side of the support frame.

As illustrated in FIG. 8, in an upper portion of a peripheral end edge of a lower end portion of the extending portion 18, a protruding claw portion 21 is formed by a step between a side edge and the peripheral end edge of the lower end portion of the extending portion 18. In the center of the lower end portion of the extending portion 18, a support shaft hole 38 for attaching an upper end portion of the first hinge arm 10 is formed. In an intermediate portion of the extending portion 18, which is located on a front and upper side of the support shaft hole 38, a support shaft hole 39 for attaching an upper end portion of the second hinge arm 11 is formed. In a base end portion of the extending portion 18, which is located on a front side of the support shaft hole 39, a support shaft hole 40 for attaching a hook bracket 27 to be described later is formed.

A lower end portion of the first hinge arm 10 is turnably supported by an inner wall of an intermediate portion of the side frame 5 in its front-rear direction via a support pin 19 serving as a second coupling pin (FIG. 3). On the other hand, a coupling pin 20 serving as a first coupling pin which protrudes toward an inner side of the support frame 4 is inserted through the support shaft hole 38 formed in the lower end portion of the extending portion 18, and a leading end portion of the coupling pin 20 is fixed by caulking to the upper end portion of the first hinge arm 10. With this structure, the upper end portion of the first hinge arm 10 is turnably coupled to the lower end portion of the extending portion 18 of the link bracket 12 via the coupling pin 20 (FIG. 2 and FIG. 4 to FIG. 7).

Figure 4:
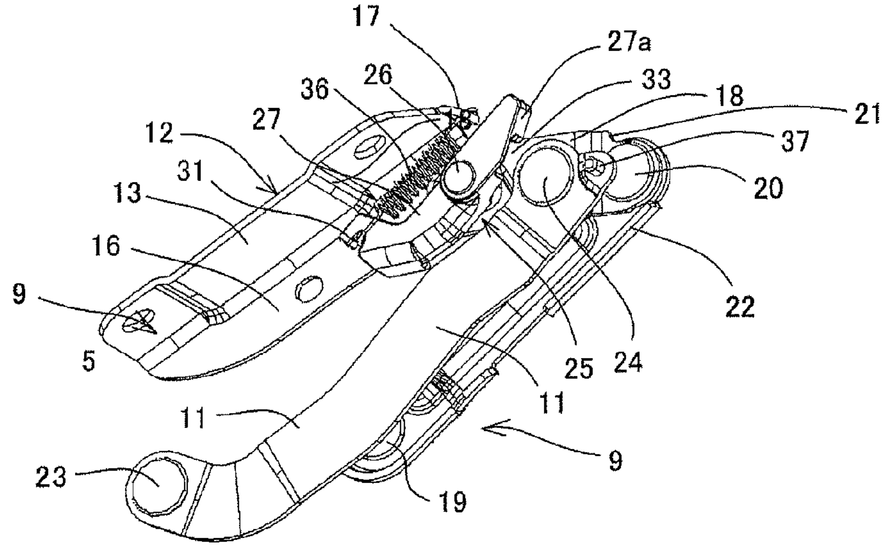
FIG. 4 is a perspective view illustrating a link mechanism in a closed state, which is observed from an inner side of the support frame.
Figure 5:
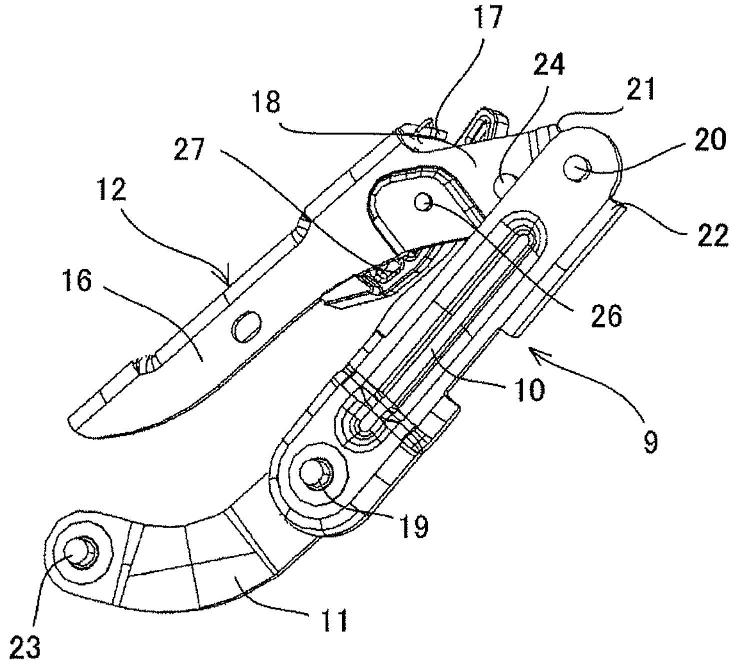
FIG. 5 is a perspective view illustrating the link mechanism in the closed state, which is observed from an outer side of the support frame.
Figure 7:
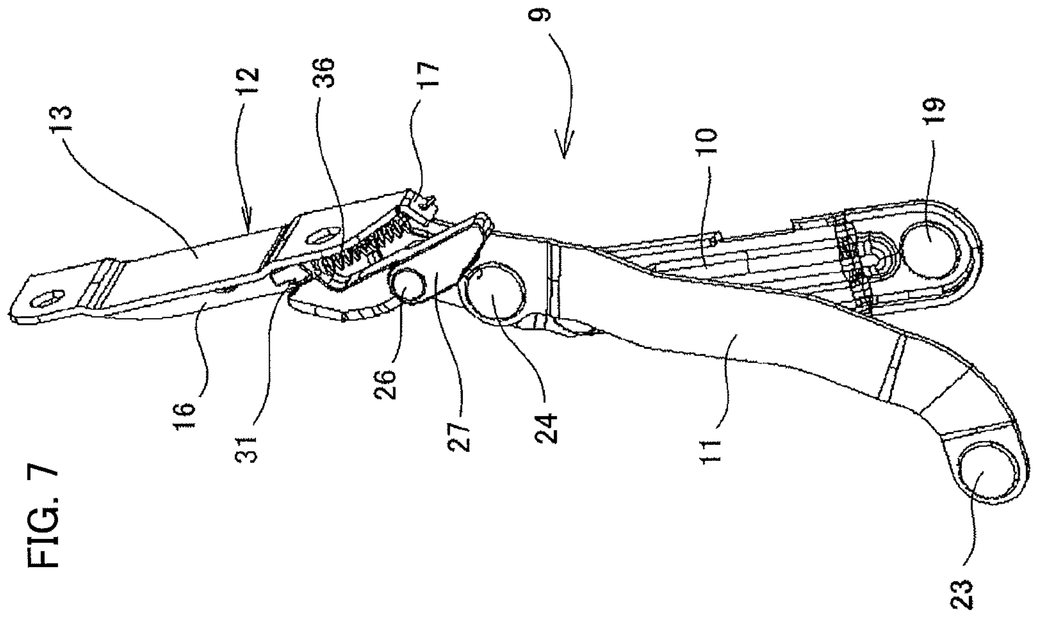
FIG. 7 is a perspective view illustrating the link mechanism in the opened state, which is observed from the inner side of the support frame.
Figure 6:
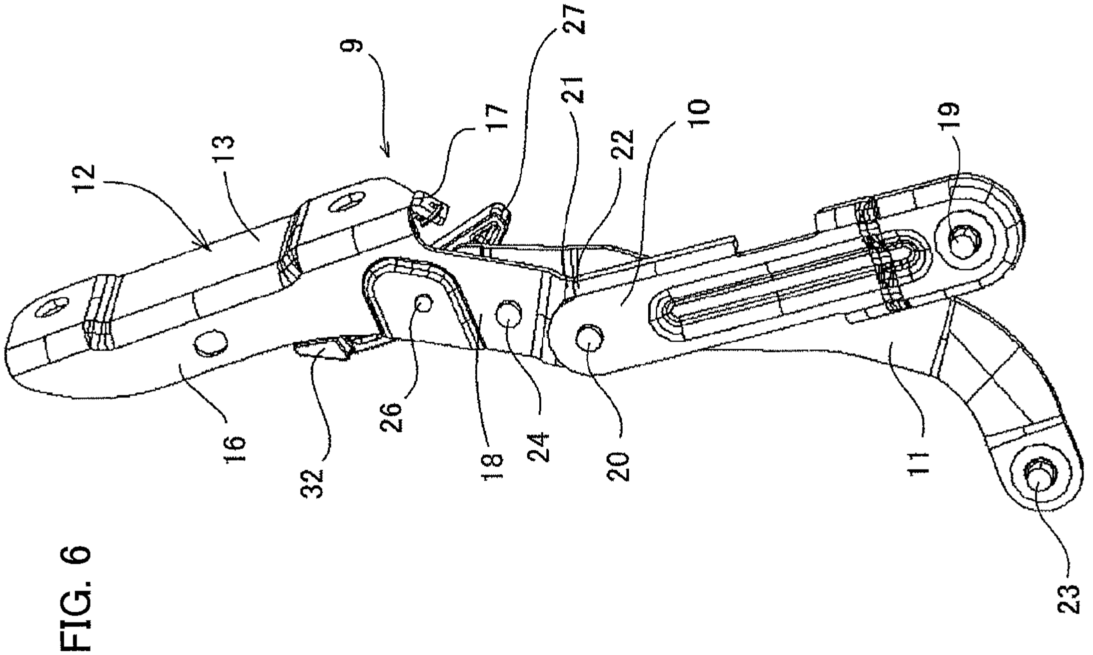
FIG. 6 is a perspective view illustrating the link mechanism in an opened state, which is observed from the outer side of the support frame.

In addition, a stopper plate 22 which is bent inward is formed at one side edge close to the upper end of the first hinge arm 10, and this stopper plate 22 abuts against the protruding claw portion 21 formed at the peripheral end edge of the lower end portion of the extending portion 18 (FIG. 4, FIG. 5, and FIG. 7). The stopper plate 22 restricts a lid opening operation of the lid to a fully opened position.

In addition, a lower end portion of the second hinge arm 11 is turnably supported by an inner side of the bracket 8 via a support pin 23 serving as a fourth coupling pin (FIG. 3). On the other hand, a coupling pin 24 serving as a third coupling pin which protrudes toward the inner side of the support frame 4 is inserted through the upper end portion of the second hinge arm 11, and a leading end portion of the coupling pin 24 is fixed by caulking to the support shaft hole 39 formed in the intermediate portion of the extending portion 18. With this structure, the upper end portion of the second hinge arm 11 is turnably coupled to the intermediate portion of the extending portion 18 of the link bracket 12 via the coupling pin 24 (FIG. 2 and FIG. 4 to FIG. 7).

As described above, the first hinge arm 10 is bridged between the side frame 5 on the support frame 4 side (vehicle body side) and the extending portion 18 of the link bracket 12 on the lid 3 side via the support pin 19 and the coupling pin 20. In addition, the second hinge arm 11 is bridged between the bracket 8 and the extending portion 18 via the support pin 23 and the coupling pin 24. Then, a distance between the coupling pin 24 and the coupling pin 20 is configured to be smaller than a distance between the support pin 23 and the support pin 19.

As a result, the link mechanism 9 is formed as the four-bar linkage by the first hinge arm 10 and the second hinge arm 11 which are turnably coupled via the support pin 19, the coupling pin 20, the support pin 23, and the coupling pin 24.

[Opened Position Holding Mechanism 25 for Fully Opened State of Lid 3]

Then, an opened position holding mechanism 25 for the fully opened state of the lid 3 is further provided to the link mechanism 9 as the four-bar linkage described above (FIG. 2 to FIG. 4 and FIG. 6). A support pin 26 which protrudes toward the inner side of the support frame 4 is fixed by caulking to the support shaft hole 40 formed in the base end portion of the extending portion 18. In addition, a central portion of the hook bracket 27 in its front-rear direction is turnably supported by the support pin 26 (FIG. 2 and FIG. 4 to FIG. 7).

Figure 9:
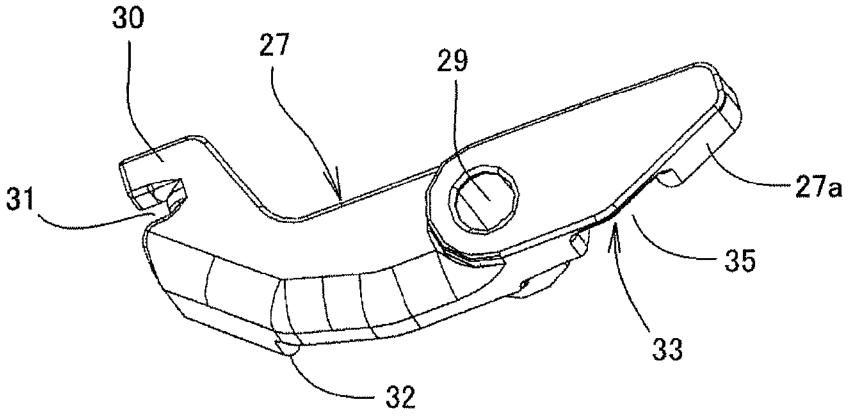
FIG. 9 is a perspective view illustrating a hook bracket, which is observed from the inner side of the support frame.
Figure 10:
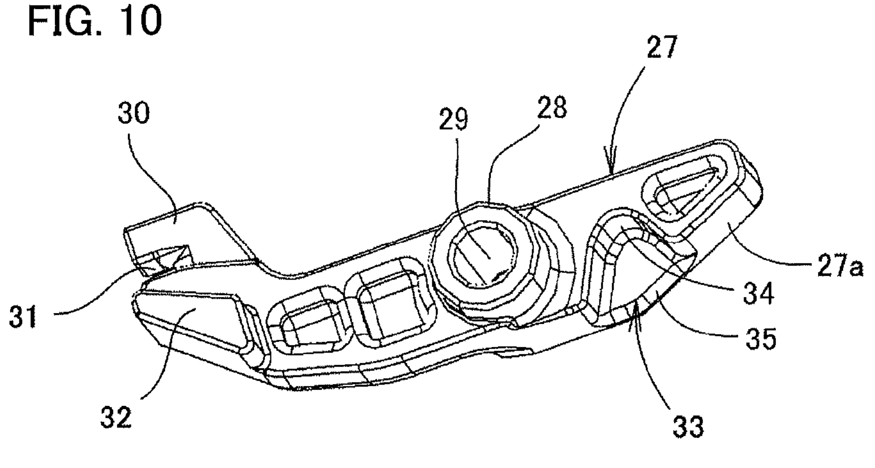
FIG. 10 is a perspective view illustrating the hook bracket, which is observed from the outer side of the support frame.

FIG. 9 is a perspective view illustrating the hook bracket 27, which is observed from the inner side of the support frame 4, and FIG. 10 is a perspective view illustrating the hook bracket 27, which is observed from an outer side of the support frame 4. A shaft support portion 28 which protrudes from an outer side surface in a boss-like shape is formed in a central portion of inner and outer side surfaces of the hook bracket 27 facing the inner side of the support frame 4, and a shaft hole 29 is formed in the shaft support portion 28 so as to pass therethrough in the left-right direction. The support pin 26 is inserted through the shaft hole 29 from the inner side surface side, and a leading end of the support pin 26 is fixed by caulking to the support shaft hole 40 formed in the base end portion of the extending portion 18 of the link bracket 12.

Accordingly, the hook bracket 27 is turnably supported with respect to the support pin 26 as the center.

A protruding piece 30 which protrudes upward is formed at an upper end edge of a front end portion of the hook bracket 27, and a hook portion 31 which is opened forward is formed in the protruding piece 30. An abutment portion 32 for positioning is formed of a protruding portion which protrudes toward the outer side of the support frame 4, at a position close to a lower end of a front end portion of the outer side surface of the hook bracket 27. In addition, an engagement concave portion 33 is formed on a rear side of the shaft support portion 28 on the outer side surface of the hook bracket 27, and includes: an apex portion 34 at the center in its width direction; and an opened portion 35 which is opened so as to become gradually wider from the apex portion 34 toward the lower side.

Further, a guide surface 27*a* which is inclined downward toward the engagement concave portion 33 at the center is formed at a lower end edge of a rear portion of the hook bracket 27, which is located on a rear side of the engagement concave portion 33 of the hook bracket 27. In addition, a front end of an urging spring 36 is hooked on the hook portion 31 of the hook bracket 27, and a rear end of the urging spring 36 is hooked on the hook piece 17 of the lid attachment portion 13 of the link bracket 12.

The hook bracket 27 is pulled by an urging force of the urging spring 36 in the clockwise direction with respect to the support pin 26 as the center. The abutment portion 32 hits against a lower end edge of the pendant plate 16 of the link bracket 12, whereby the hook bracket 27 is restricted at its initial position with respect to the extending portion 18 (FIG. 5 and FIG. 7).

In addition, on a rear side of the second hinge arm 11 with respect to the coupling pin 24 which is a coupling portion between the second hinge arm 11 and the extending portion 18, an engagement pin 37 which protrudes toward the inner side of the support frame 4 is fixed by caulking (FIG. 4). It should be noted that, at the time of transition to the fully opened state of the lid 3, the engagement pin 37 engages with the engagement concave portion 33 of the hook bracket 27, to thereby hold the lid 3 in the fully opened state. Further, in order to ensure the strength of the hook bracket 27, the engagement concave portion 33 may have a side surface which is closed, the side surface being opposed to a leading end of the engagement pin 37 which is fitted into the engagement concave portion 33.

It should be noted that examples of the urging spring 36 always urging the rear portion of the hook bracket 27 to turn downward may include a torsion spring and a leaf spring as well as the coil spring as shown in FIG. 4 and other drawings, and the turning mechanism can be configured depending on each aspect of each spring.

[Motion of Link Mechanism 9]

Figures 12A, 12B, 12C:
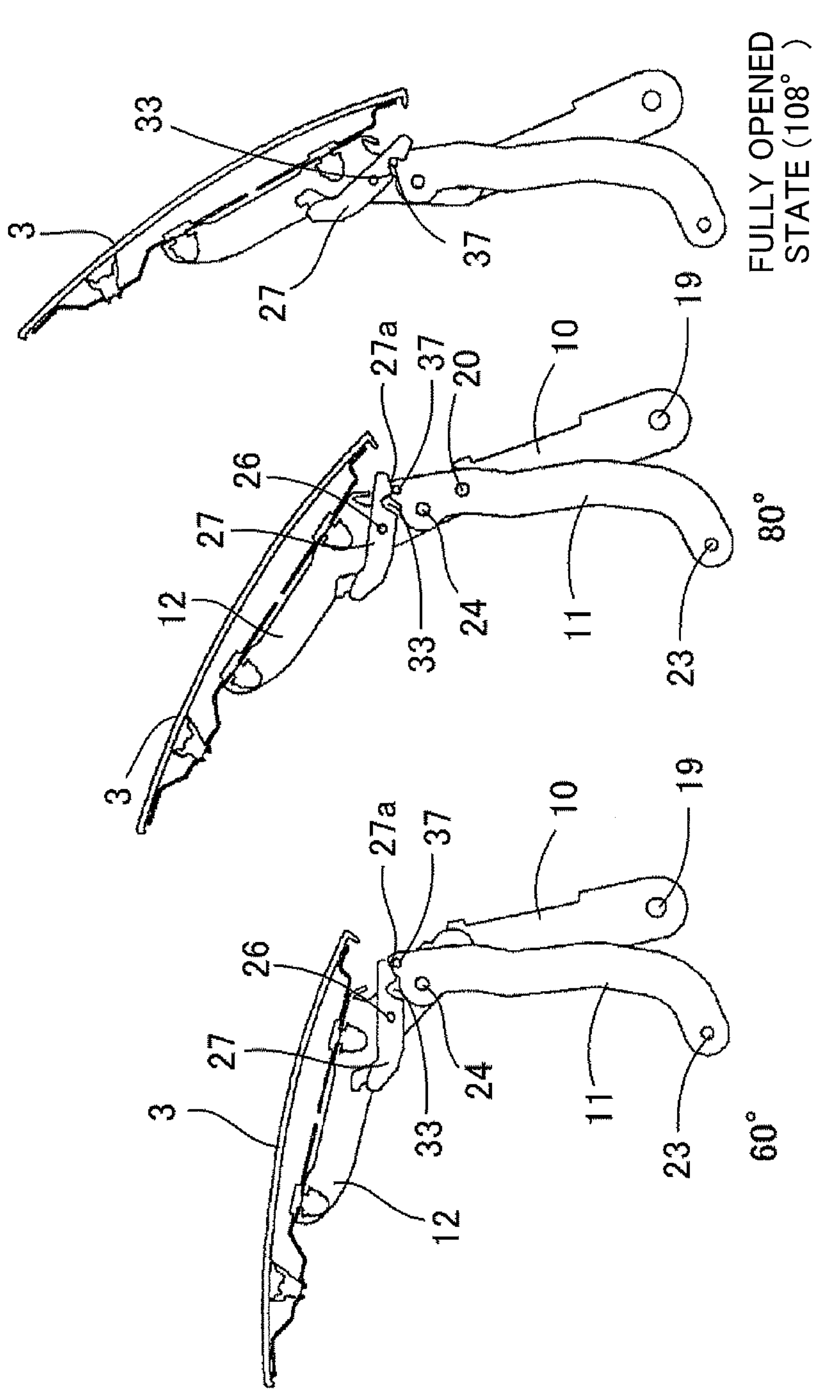
FIGS. 12A, 12B, and 12C are the continuation of FIGS. 11A, 11B, and 11C, and illustrate the latter half of the motion tracks.

Next, the motion of the link mechanism 9 of the lid 3 thus configured is described with reference to FIG. 11A to FIG. 16. FIG. 11A to FIG. 12C are side views illustrating motion tracks of the lid 3, the link mechanism 9, and the opened position holding mechanism 25 from the fully closed state to the fully opened state. FIGS. 11A, 11B, and 11C illustrate the first half of the motion tracks, and FIGS. 12A, 12B, and 12C illustrate the latter half thereof. FIG. 1 is a cross sectional view illustrating the state where the lid 3 is fully closed. With reference to FIG. 1, the rear end portion of the lid 3 is supported by the link mechanism 9 in the vicinity of a rear end of the support frame 4, and the striker 15 provided at the center of the front end portion of the rear surface of the lid 3 is locked by the lock mechanism 45 provided in the central portion of the lower front frame 6 (FIG. 2), whereby the lid 3 is held in the fully closed state.

In the fully closed state of the lid 3, the striker 15 is fixed by the lock mechanism 45, so that movement of the lid 3 in the front-rear direction of the vehicle body is blocked. Therefore, a relative position in the front-rear direction between: the link bracket 12 which constitutes the link mechanism 9 and is attached to the lid 3; and the side frame 5 and the bracket 8 is restricted. Because the positions in the front-rear direction, of the link bracket 12, the side frame 5, and the bracket 8 are restricted, mutual turn between the first hinge arm 10 and the second hinge arm 11 which are bridged between the link bracket 12, and the side frame 5 and the bracket 8, respectively, is blocked. Therefore, a relative position relation among respective members of the link bracket 12, the first hinge arm 10, and the second hinge arm 11 is maintained, and the lid 3 is stably held at the fully closed position (fully closed state illustrated in FIG. 11A).

Meanwhile, when the lock of the striker 15 by the lock mechanism 45 is released and the front end portion of the lid 3 is moved up, to thereby perform the opening operation of the lid 3 (referred to as lid opening operation), a movement track is accordingly restricted by the four-bar linkage which is formed of: the link bracket 12 coupled to the lid 3; the first hinge arm 10 bridged between the link bracket 12 and the side frame 5; the second hinge arm 11 bridged between the link bracket 12 and the bracket 8; and the support pin 19, the coupling pin 20, the support pin 23, and the coupling pin 24 which couple these members to each other. Therefore, the state sequentially changes in the following order: the fully closed state illustrated in FIG. 11A (a state where the opening portion 2 of the panel 1 of the vehicle body is closed by the lid 3); a 20°-opened state illustrated in FIG. 11B where the lid 3 is opened at 20° with respect to the opening portion 2 of the panel 1; a 40°-opened state [FIG. 11C]; and then a 60°-opened state illustrated in FIG. 12A. It should be noted that, during this change in state, the hook bracket 27 is pulled by the urging force of the urging spring 36 in the clockwise direction with respect to the support pin 26 as the center. Therefore, the abutment portion 32 is located at its initial position at which the abutment portion 32 hits against the lower end edge of the pendant plate 16 of the link bracket 12.

[Opening Operation of Lid]

In the fully closed state of the lid 3 illustrated in FIG. 11A, the engagement between the striker 15 and the lock mechanism 45 is released, and the front end portion of the lid 3 is moved up (referred to as lid opening operation). Consequently, the link bracket 12 attached to the lid 3 turns in the clockwise direction with respect to the coupling pin 24 as the center, so that the lid 3 is opened. When the link bracket 12 turns in the clockwise direction with respect to the coupling pin 24 as the center, the coupling pin 20 also turns in the clockwise direction with respect to the coupling pin 24 as the center.

When the coupling pin 20 turns in the clockwise direction, the upper end portion of the first hinge arm 10 axially supported by the coupling pin 20 is pulled forward, the first hinge arm 10 turns in the counterclockwise direction with respect to the support pin 19 in the lower end portion of the first hinge arm 10 as the center, and the first hinge arm 10 makes gradual transition to a standing state. When the first hinge arm 10 turns in the counterclockwise direction to make transition to the standing state, the link bracket 12 is also pushed forward and upward. In addition, because the first hinge arm 10 and the second hinge arm 11 constitute the link mechanism, when the first hinge arm 10 turns in the counterclockwise direction to make transition to the standing state, the second hinge arm 11 also turns in the counterclockwise direction with respect to the support pin 23 as the center to similarly make gradual transition to a standing state. As a result, in accordance with the lid opening operation of the lid 3, the link bracket 12 moves in a direction in which the entire link bracket 12 protrudes in a forward direction, and also moves upward, so that the lid 3 moves to the 20°-opened position illustrated in FIG. 11B.

If the lid opening operation of the lid 3 is further continued, the link bracket 12 turns in the clockwise direction with respect to the coupling pin 24 as the center, and hence the lid 3 turns in the clockwise direction to be opened. The coupling pin 20 further turns in the clockwise direction in accordance with this lid opening operation of the lid 3, and the first hinge arm 10 accordingly turns in the counterclockwise direction with respect to the support pin 19 as the center to make gradual transition to the standing state. Similarly, the second hinge arm 11 also makes gradual transition to the standing state, and hence the state sequentially changes from the 20°-opened position of FIG. 11B to the 40°-opened position of FIG. 11C and then from the 40°-opened position to the 60°-opened state illustrated in FIG. 12A.

During this change in state, the abutment portion 32 of the hook bracket 27 is maintained at its initial position at which the abutment portion 32 hits against the lower end edge of the pendant plate 16 of the link bracket 12. In addition, at the 60°-opened position, the guide surface 27*a* (FIG. 13) formed at the lower end edge of the rear portion of the hook bracket 27 abuts against the engagement pin 37 provided in the rear end portion of the second hinge arm 11.

When the engagement pin 37 provided in the rear end portion of the second hinge arm 11 hits against the guide surface 27*a* located at the lower end edge of the rear portion of the hook bracket 27, the urging force (pulling force) of the urging spring 36 counteracts the turn of the second hinge arm 11 in the counterclockwise direction with respect to the coupling pin 24 in the rear end portion of the second hinge arm 11 as the center. Therefore, the subsequent lid opening operation is to be performed against the pulling force of the urging spring 36.

[Motion of Opened Position Holding Mechanism 25]

The motion from the 60°-opened position at which the guide surface 27*a* (FIG. 13) located at the lower end edge of the rear portion of the hook bracket 27 abuts against the engagement pin 37 provided in the rear end portion of the second hinge arm 11 (a state where the lid 3 is opened at 60° with respect to the opening portion 2 of the panel 1) to the fully opened position is described with reference to FIG. 13 to FIG. 16.

Figure 13:
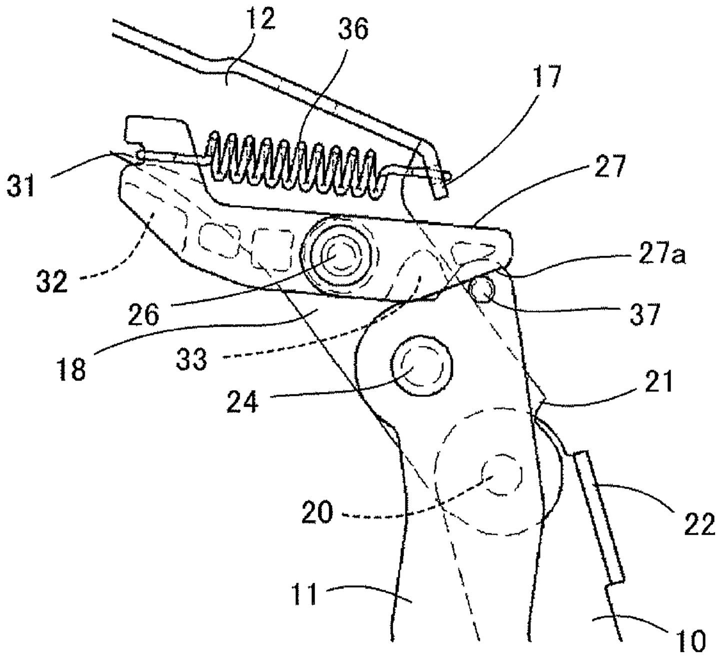
FIG. 13 is a side view illustrating a motion from a time point at which an engagement pin in a rear end portion of a second hinge arm hits against a lower end edge of a rear portion of the hook bracket (from the moment of hitting) to a fully opened position.

In FIG. 13, when the front end portion of the lid 3 is moved up to perform the lid opening operation, the lid 3 turns in the clockwise direction with respect to the coupling pin 24 as the center. Because the guide surface 27*a* located at the lower end edge of the rear portion of the hook bracket 27 abuts against the engagement pin 37 provided in the rear end portion of the second hinge arm 11 due to the force of the urging spring 36, the lid 3 is moved up against the force of the urging spring 36. When the lid 3 is moved up against the force of the urging spring 36, the link bracket 12 turns in the clockwise direction with respect to the coupling pin 24 as the center. In accordance with this turn, the hook bracket 27 axially supported by the support pin 26 integrally turns in the clockwise direction around the coupling pin 24.

The guide surface 27*a* of the hook bracket 27 is pushed against the engagement pin 37, and the guide surface 27*a* has a shape which is inclined downward toward the engagement concave portion 33 at the center. Therefore, as the hook bracket 27 turns in the clockwise direction with respect to the coupling pin 24 as the center, the hook bracket 27 turns in the counterclockwise direction with respect to the support pin 26 as the center against the pulling force of the urging spring 36. As a result of this turn, the abutment portion 32 turns in the counterclockwise direction from its initial position at which the abutment portion 32 hits against the lower end edge of the pendant plate 16 of the link bracket 12, and thus is separated from the pendant plate 16.

Figure 14:
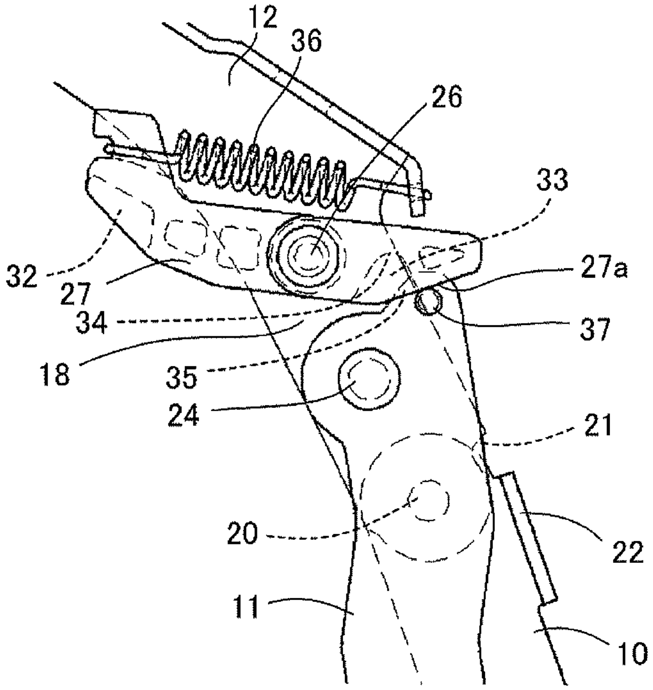
FIG. 14 is the continuation of FIG. 13 (a state where the engagement pin has moved to an edge of an opened portion of an engagement concave portion)

When the lid 3 is continuously moved up, the extending portion 18 of the link bracket 12, the support pin 26, and the coupling pin 20 integrally turn in the clockwise direction with respect to the coupling pin 24 as the center, and the hook bracket 27 turns in the counterclockwise direction with respect to the support pin 26 as the center. Therefore, the hit position between the guide surface 27*a* of the hook bracket 27 and the engagement pin 37 moves toward the center of the hook bracket 27 (FIG. 14). The guide surface 27*a* has such a smooth surface that enables the hit position to move smoothly.

Figure 15:
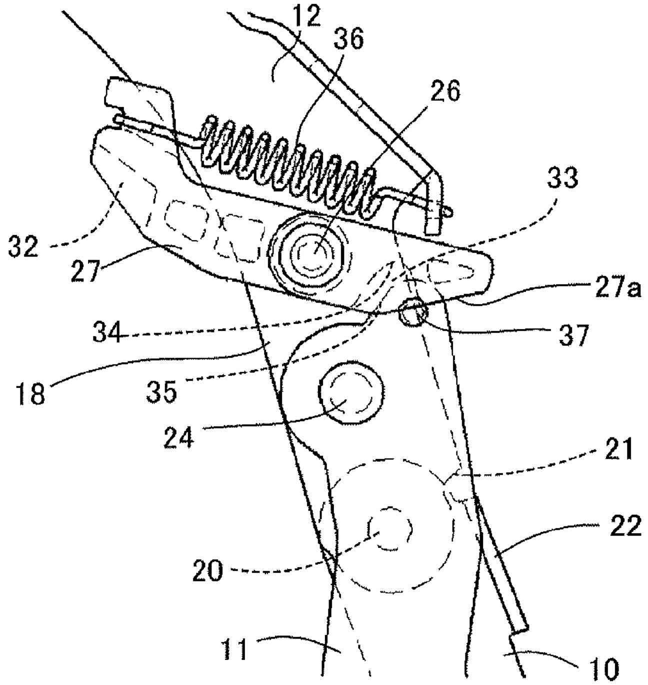
FIG. 15 is the continuation of FIG. 14 (a state where the engagement pin has moved beyond the edge of the opened portion of the engagement concave portion)
Figure 16:
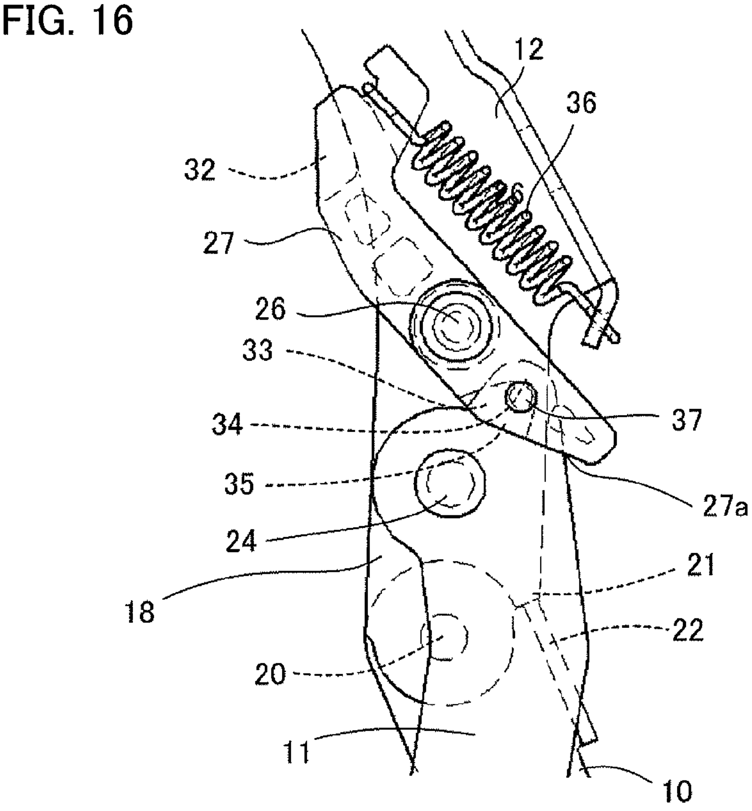
FIG. 16 is the continuation of FIG. 15 (a state where the engagement pin is engaged with an apex portion of the engagement concave portion).

When the lid 3 is further continuously moved up, the engagement pin 37 moves beyond an edge of the opened portion 35 of the engagement concave portion 33 which is formed on the rear side of the shaft support portion 28 on the rear surface of the hook bracket 27 (FIG. 15). When the engagement pin 37 moves beyond the edge of the engagement concave portion 33, a pressing force disappears due to the opened portion 35, and hence the hook bracket 27 is turned in the clockwise direction with respect to the support pin 26 as the center by only the pulling force in the clockwise direction with respect to the support pin 26 as the center, exerted by the urging spring 36 to the hook bracket 27. Therefore, the engagement pin 37 is fitted into the engagement concave portion 33 from the opened portion 35, and the engagement pin 37 is engaged with the apex portion 34 of the engagement concave portion 33 (FIG. 16). In addition, the abutment portion 32 returns to its initial position at which the abutment portion 32 hits against the lower end edge of the pendant plate 16 of the link bracket 12. At the same time, the protruding claw portion 21 formed at the peripheral end edge of the lower end portion of the extending portion 18 of the link bracket 12 abuts against an upper end surface of the stopper plate 22 of the first hinge arm 10, so that the lid opening operation is stopped, to thereby bring the lid 3 into the fully opened state.

In the state illustrated in FIG. 16 where the lid 3 is held to be fully open, the pulling force of the urging spring 36 in the clockwise direction with respect to the support pin 26 as the center is applied to the hook bracket 27. Therefore, unless a force of pushing up the hook bracket 27 in the counterclockwise direction with respect to the support pin 26 as the center against the pulling force of the urging spring 36 is applied to the engagement pin 37, the lid 3 is not closed, and thus is held in the fully opened state. In addition, due to the pulling force of the urging spring 36, the abutment portion 32 is held at its initial position at which the abutment portion 32 hits against the lower end edge of the pendant plate 16 of the link bracket 12.

In this way, the force of holding the lid 3 in the fully opened state is set by the pulling force of the urging spring 36. Accordingly, the force of holding the lid 3 in the opened state can be changed by changing the urging spring 36 and thus changing the pulling force. That is, even if an operator applies force by mistake in the direction in which the lid 3 is closed, the lid 3 can be held in the fully opened state. In addition, settings which do not become a burden to the operator at the time of the opening and closing operation of the lid 3 are possible.

In addition, a stopper mechanism is configured by: the protruding claw portion 21 formed in a peripheral portion of the coupling pin 20 in the lower end portion of the extending portion 18; and the stopper plate 22 formed in the peripheral portion of the coupling pin 20 in the upper end portion of the first hinge arm 10. That is, the protruding claw portion 21 of the extending portion 18 of the link bracket 12 abuts against the stopper plate 22 of the first hinge arm 10, whereby the lid opening operation of the lid 3 can be reliably stopped and the stability of the fully opened state of the lid 3 can be secured.

[Closing Operation of Lid]

The closing operation of the lid 3 can be performed by pushing down the front end portion of the lid 3, to thereby apply, to the engagement pin 37, the force of pushing up the hook bracket 27 in the counterclockwise direction with respect to the support pin 26 as the center against the pulling force of the urging spring 36. In this way, the engagement pin 37 can be separated from the engagement concave portion 33 as illustrated from FIG. 16 to FIG. 15, from FIG. 15 to FIG. 14, and from FIG. 14 to FIG. 13. The subsequent closing operation is performed in reverse order of the opening operation of the lid.

According to the lid opening and closing apparatus of the present invention, it is possible to perform the operation with one hand from start of the opening operation to holding of the fully opened state of the lid 3. In addition, the link mechanism 9 is provided with the support structure for holding the lid 3 in the opened state, and hence it is possible to save more space compared with an apparatus using a gas cylinder, and manufacture the apparatus inexpensively in terms of the cost of parts. Further, when the lid 3 is closed from the opened state, the lid 3 can be closed with a smaller operation force compared with the apparatus using the gas cylinder with a repulsive force which is large enough to move up the lid 3, and a click feeling can provided.

What is claimed is:

1. A lid opening and closing apparatus which opens and closes a lid for an opening portion formed in a vehicle body, comprising:

a link mechanism which is provided between the lid and the vehicle body and functions as a hinge when the lid is opened and closed; and an opened position holding mechanism which maintains an opened position of the lid, wherein the opened position holding mechanism operates in accordance with turns of links included in the link mechanism, and blocks turns between the links, to thereby maintain the opened position of the lid, the link mechanism is a four-bar linkage, and includes:

a support frame as a first link which is fixed to a periphery of the opening portion of the vehicle body;

a link bracket as a second link which is fixed to a rear surface of the lid; and a first hinge arm as a third link and a second hinge arm as a fourth link which are bridged between the link bracket and the support frame;

the second hinge arm is longer than the first hinge arm;

the first hinge arm has an upper end portion which is turnably coupled to the link bracket via a first coupling pin, and a lower end portion which is turnably coupled to the support frame via a second coupling pin;

the second hinge arm has an upper end portion which is turnably coupled to the link bracket on a front side of the first coupling pin via a third coupling pin, and a lower end portion which is turnably coupled to the support frame on a front side of the second coupling pin via a fourth coupling pin;

a distance between the first coupling pin and the third coupling pin is smaller than a distance between the second coupling pin and the fourth coupling pin; and a front end portion of the link bracket turns upward when the lid is opened, the opened position holding mechanism includes:

a first mechanism including a hook bracket which turns in accordance with the turns of the links included in the link mechanism when the lid is opened and closed; and a second mechanism formed of a stopper structure between a rear portion of the link bracket and the upper end portion of the first hinge arm in the four-bar linkage;

the hook bracket of the first mechanism fixes a turn between the link bracket as the second link and the second hinge arm as the fourth link when the lid is located at the opened position;

the stopper structure of the second mechanism fixes a turn between the link bracket as the second link and the first hinge arm as the third link at the opened position of the lid; and both the first mechanism and the second mechanism release the fixing of the turns between the links when the links turn in a direction in which the lid is closed.

2. The lid opening and closing apparatus according to claim 1, wherein:

the link bracket includes a lid attachment portion and an extending portion which extends obliquely downward toward a rear side from a rear portion of the lid attachment portion; and the extending portion serves as the second link of the four-bar linkage.

3. The lid opening and closing apparatus according to claim 1, wherein:

the first mechanism of the opened position holding mechanism includes the hook bracket, an urging spring, and an engagement pin;

the hook bracket has:

a central portion which is supported by the link bracket via a support pin, to thereby enable the hook bracket to turn up and down;

a front end portion in which an abutment portion against the link bracket is provided; and a rear end portion in which an engagement concave portion engaging with the engagement pin and a smooth guide surface reaching the engagement concave portion are provided;

the urging spring always urges the rear portion of the hook bracket to turn downward;

the engagement pin abuts against the upper end portion of the second hinge arm corresponding to the guide surface of the hook bracket, and is provided in such a position as to be fitted into the engagement concave portion of the hook bracket when the lid is located at the opened position; and the hook bracket is turned by the urging spring in accordance with an opening motion of the lid, the guide surface in the rear portion of the hook bracket abuts from above against the engagement pin provided to the second hinge arm during a latter half of the opening motion, the abutment portion of the hook bracket abuts from below against the link bracket at the opened position of the lid, and the engagement pin is fitted into the engagement concave portion of the hook bracket, whereby the lid and the link mechanism are engaged with each other, to thereby block the turns of the links.

4. The lid opening and closing apparatus according to claim 3, wherein the urging spring is a coil spring and the hook bracket further has a hook portion for the coil spring on the front end portion thereof, the coil spring being suspended between the hook portion of the hook bracket and the rear portion of the link bracket corresponding to an upper portion of the support pin, to thereby always urge the rear portion of the hook bracket to turn downward.

5. The lid opening and closing apparatus according to claim 3 , wherein the engagement concave portion formed in the rear end portion of the hook bracket has a side surface which is closed, the side surface being opposed to a leading end of the engagement pin which is fitted into the engagement concave portion.

6. The lid opening and closing apparatus according to claim 4, wherein the engagement concave portion formed in the rear end portion of the hook bracket has a side surface which is closed, the side surface being opposed to a leading end of the engagement pin which is fitted into the engagement concave portion.

* * * * *